(12) United States Patent
Cherng et al.

(10) Patent No.: US 10,355,324 B2
(45) Date of Patent: Jul. 16, 2019

(54) DEGASSING METHOD FOR LITHIUM BATTERY CELL

(71) Applicant: AMITA TECHNOLOGIES INC LTD., Taoyuan (TW)

(72) Inventors: Jing-Yih Cherng, Taoyuan (TW); Chih-Tsung Hu, Taoyuan (TW); Wen-Chang Chiang, Taoyuan (TW); Nai-Yuan Liu, Taoyuan (TW)

(73) Assignee: AMITA TECHNOLOGIES INC LTD., Taoyuan (TW)

(*) Notice: Subject to any disclaimer, the term of this patent is extended or adjusted under 35 U.S.C. 154(b) by 131 days.

(21) Appl. No.: 15/660,955

(22) Filed: Jul. 27, 2017

(65) Prior Publication Data

US 2018/0366793 A1 Dec. 20, 2018

(30) Foreign Application Priority Data

Jun. 16, 2017 (TW) .............................. 106120237 A

(51) Int. Cl.
*H01M 2/36* (2006.01)
*H01M 10/05* (2010.01)
(Continued)

(52) U.S. Cl.
CPC .............. *H01M 10/52* (2013.01); *H01M 6/50* (2013.01); *H01M 10/058* (2013.01);
(Continued)

(58) Field of Classification Search
None
See application file for complete search history.

(56) References Cited

U.S. PATENT DOCUMENTS

| 2005/0244705 A1* | 11/2005 | Cherng | H01M 2/12 429/52 |
| 2011/0171503 A1* | 7/2011 | Giroud | H01M 2/0207 429/50 |
| 2013/0312869 A1 | 11/2013 | Klien et al. | |

FOREIGN PATENT DOCUMENTS

| CN | 103411795 A | 11/2013 |
| EP | 2860809 A1 | 4/2015 |

(Continued)

OTHER PUBLICATIONS

Machine translation of JP 2015-133179, Jul. 2015.*
(Continued)

*Primary Examiner* — Jonathan Crepeau
(74) *Attorney, Agent, or Firm* — Chun-Ming Shih; HDLS IPR Services

(57) ABSTRACT

A degassing method for a lithium battery cell includes the following steps: providing a lithium battery cell including a sealed bag, a degassing tube is arranged on the sealed bag and an end of the degassing tube is communicated with a space in the sealed bag, the sealed bag is filled with electrolyte solution and a remnant gas is contained therein; providing a negative pressure on an external surface of the sealed bag to inflate the sealed bag and therefore decompress the sealed bag to vaporize a part of the electrolyte solution, and the remnant gas is separated from the liquid electrolyte solution and mixed with the vaporized electrolyte solution to form a mixed gas; extracting the mixed gas via the degassing tube, therefore the vaporized electrolyte is pressurized to be liquefied in the degassing tube, and the remnant gas is discharged through the degassing tube.

9 Claims, 8 Drawing Sheets

(51) Int. Cl.
  *H01M 10/42* (2006.01)
  *H01M 10/52* (2006.01)
  *H01M 10/058* (2010.01)
  *H01M 6/50* (2006.01)
  *H01M 2/02* (2006.01)
  *H01M 10/0565* (2010.01)

(52) U.S. Cl.
  CPC .......... *H01M 10/42* (2013.01); *H01M 2/0275* (2013.01); *H01M 2/365* (2013.01); *H01M 10/0565* (2013.01)

(56) References Cited

FOREIGN PATENT DOCUMENTS

| | | |
|---|---|---|
| JP | 2015133179 A | 7/2015 |
| TW | I257755 B | 7/2006 |

OTHER PUBLICATIONS

Search Report dated Mar. 5, 2018 of the corresponding European patent application.
Office Action dated Dec. 4, 2017 of the corresponding Taiwan patent application.

\* cited by examiner

DEGASSING METHOD FOR LITHIUM BATTERY CELL

BACKGROUND OF THE INVENTION

Technical Field

The present disclosure relates to manufacturing process of a lithium battery cell, in particular to a degassing method for a lithium battery cell.

Description of Related Art

A conventional lithium battery cell includes an outer bag, multiple electrodes are contained in the outer bag, an electrolyte solution is filled in the outer bag, and the electrodes are thereby immersed in the electrolyte solution and able to undergo a chemical reaction with the electrolyte solution to charge or discharge.

The assembled lithium battery cell should be activated namely the electrode is reacted with the electrolyte solution during an activation process, and a gas is thereby generated. The gas exists in the electrolyte solution as bubbles, the electrolyte solution is separated from the electrode by the bubble and therefore cannot react, and a performance of the lithium battery cell is therefore decreased.

Accordingly, the bubbles should be extracted from the activated lithium battery cell. The bubble might be anywhere in the lithium battery cell, the electrolyte solution is gel and is difficult to flow, so much time is spent in a degassing process for moving the bubbles, however the bubble still cannot be completely removed. Furthermore, the electrolyte solution between the bubble and a vacuum point is extracted with the extracted gas, and loss of electrolyte solution during the degassing process is therefore unavoidable; more electrolyte solution needs to be filled in the lithium battery cell during assembly process to compensate the loss of the electrolyte solution during the degassing process and as a result, production costs are increased.

In views of this, in order to solve the above disadvantage, the present inventor studied related technology and provided a reasonable and effective solution in the present disclosure.

SUMMARY

A degassing method for lithium battery cell is provided in the present disclosure to avoid loss of electrolyte solution during a degassing process.

A degassing method for a lithium battery cell is provided in the present disclosure, and the method includes the following steps: providing a lithium battery cell including a sealed bag, a degassing tube is arranged on the sealed bag and an end of the degassing tube is communicated with a space in the sealed bag, the sealed bag is filled with an electrolyte solution and a remnant gas is contained therein; providing a negative pressure on an external surface of the sealed bag to inflate the sealed bag and therefore decompress the sealed bag to vaporize a part of the electrolyte solution, and the remnant gas is separated from the liquid electrolyte solution and mixed with the vaporized electrolyte solution to form a mixed gas; extracting the mixed gas via the degassing tube, therefore the vaporized electrolyte is pressurized to be liquefied in the degassing tube, and the remnant gas is discharged through the degassing tube.

The degassing method for lithium battery cell of the present disclosure further includes a step of injecting the liquid electrolyte solution in the degassing tube back into the sealed bag.

According to the degassing method for lithium battery cell of the present disclosure, the lithium battery cell is arranged in a pressure chamber, and a negative pressure is provided in the pressure chamber and the negative pressure is thereby provided on an external surface of the sealed bag.

According to the degassing method for lithium battery cell of the present disclosure, a positive pressure is provided on the external surface of the sealed bag to drive the mixed gas to flow into the degassing tube. The lithium battery cell is arranged in a pressure chamber, and a positive pressure is thereby provided in the pressure chamber and the positive pressure is thereby provided on the external surface of the sealed bag.

According to the degassing method for lithium battery cell of the present disclosure, a negative pressure is provided on the other end of the degassing tube to drive the mixed gas to flow into the degassing tube.

According to the degassing method for lithium battery cell of the present disclosure, the other end of the degassing tube is sealed, the degassing tube should be cut and the mixed gas is thereby allowed to flow into the degassing tube.

The degassing method for lithium battery cell of the present disclosure further includes a step of sealing a seal position on the degassing tube. A portion of the degassing tube between the seal position and the sealed bag is remained and the other portion of degassing tube is removed.

According to the degassing method for lithium battery cell of the present disclosure, multiple electrodes are contained in the sealed bag and the electrodes are immersed in the electrolyte solution.

According to the degassing method for lithium battery cell of the present disclosure, the electrolyte solution is vaporized by vacuum and thereby easy to move in the electrolyte solution to be separated. The present disclosure is able to completely remove bubbles from the electrolyte solution and spend less time in contrast to conventional technologies, and the present disclosure further avoids loss of electrolyte solution during a degassing process.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
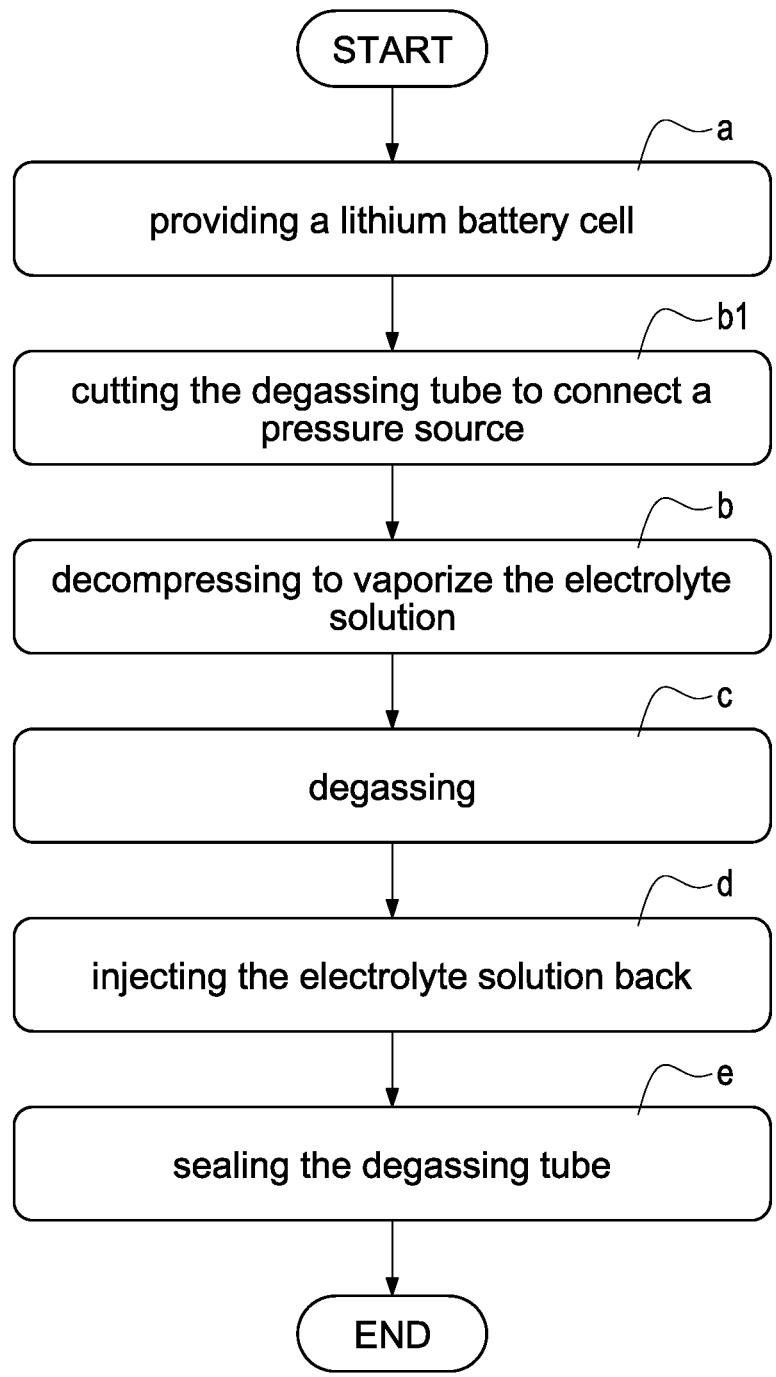
FIG. 1 is a flowchart showing a degassing method for lithium battery cell disclosed in an embodiment of the present disclosure.
Figure 2:
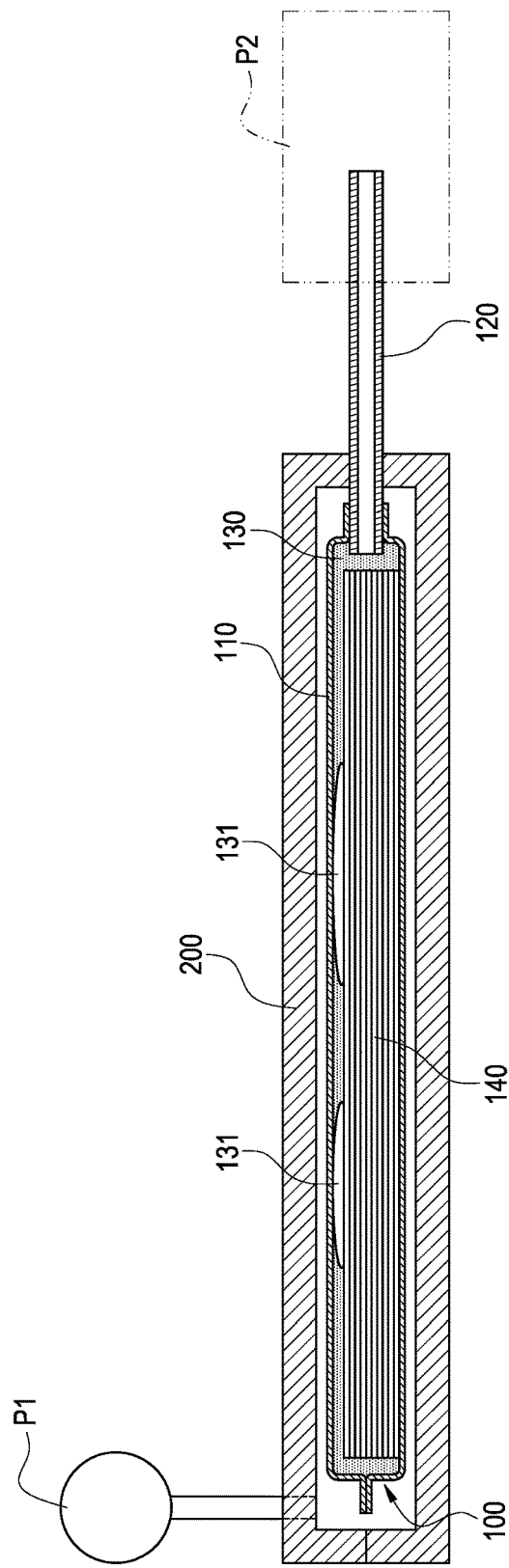
FIGS. 2 to 8 are schematic diagrams showing the steps of the degassing method for lithium battery cell disclosed in the embodiment of the present disclosure.

According to FIG. 1, a degassing method for lithium battery cell is provided in an embodiment of the present disclosure, and the degassing method includes the following steps:

According to FIGS. 1 to 2, a lithium battery cell 100 is provided in a step a, the lithium battery cell 100 is arranged in a pressure chamber 200, and the pressure chamber 200 is communicated with a pressure source P1, the pressure source P1 is able to provide a positive pressure or a negative pressure in the pressure chamber 200. The lithium battery cell 100 includes a sealed bag 110 made of metal foils, a degassing tube 120 is provided on an external surface of the sealed bag 110 and an end of the degassing tube 120 is communicated with an space in the sealed bag 110, the other end of the degassing tube 120 is sealed, and the space in the sealed bag 110 is therefore sealed. An electrolyte solution 130 is filled in the sealed bag 110, and multiple electrodes 140 arranged in a stack are contained in the sealed bag 110, the electrodes 140 are immersed in electrolyte solution 130. The lithium battery cells 100 according to the present embodiment are activated lithium battery cell 100, and a remnant gas 131 generated during the activation process is therefore contained in the sealed bag 110, the electrolyte solution 130 is gel, and the remnant gas 131 exists in the electrolyte solution 130 as bubbles.

Figure 3:
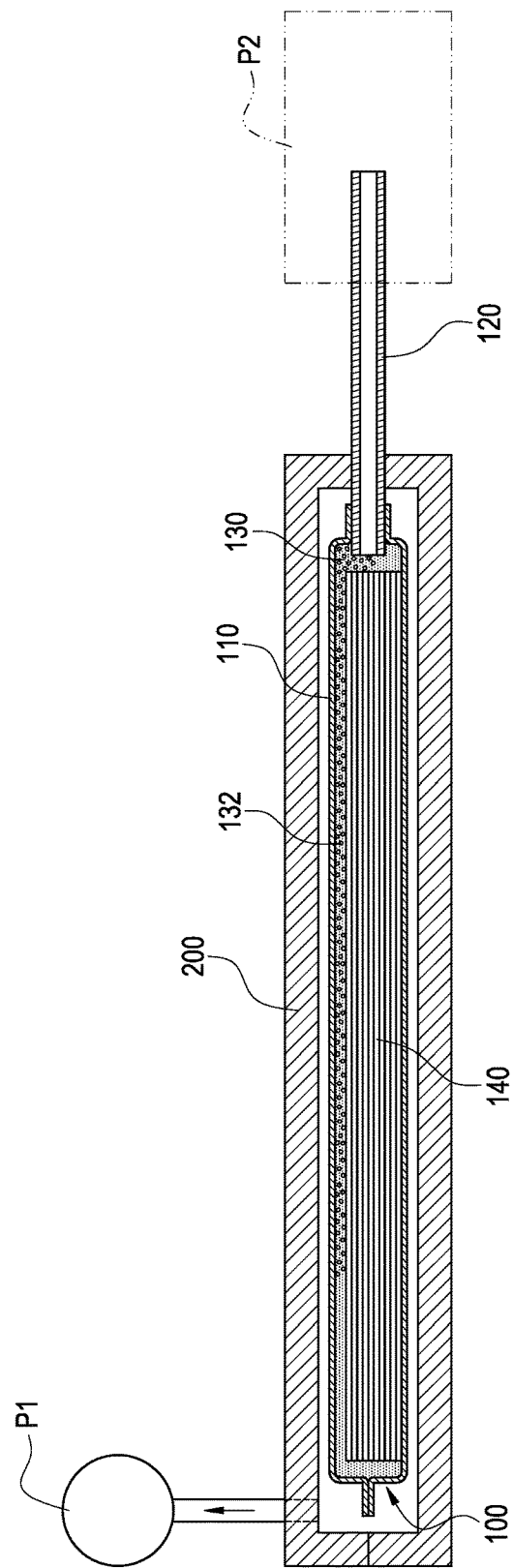

According to FIGS. 1 and 3, a negative pressure is provided on the external surface of the lithium battery cell 100 in a step b following the step a, and the sealed bag 110 is thereby inflated. Preferably, a negative pressure is provided in the pressure chamber 200, and the negative pressure is thereby provided on the external surface of the lithium battery cell 100. Thereby, pressure in the sealed bag 110 is decreased to vaporize a part of the electrolyte solution 130 in the sealed bag 110, the remnant gas 131 is separated from the liquid electrolyte solution 130 and mixed with the vaporized electrolyte solution 130 to form a mixed gas 132. According to the present embodiment, the step b preferably includes a step b1 of cutting the degassing tube 120 in advance and the mixed gas 132 is allowed to flow into the degassing tube 120, and the cut sealed end is connected with another pressure source P2 (for example, a degassing machine) to control flux and flowing direction of the gas in the degassing tube 120, but scope of the present disclosure should not be limited to the embodiment.

Figure 4:
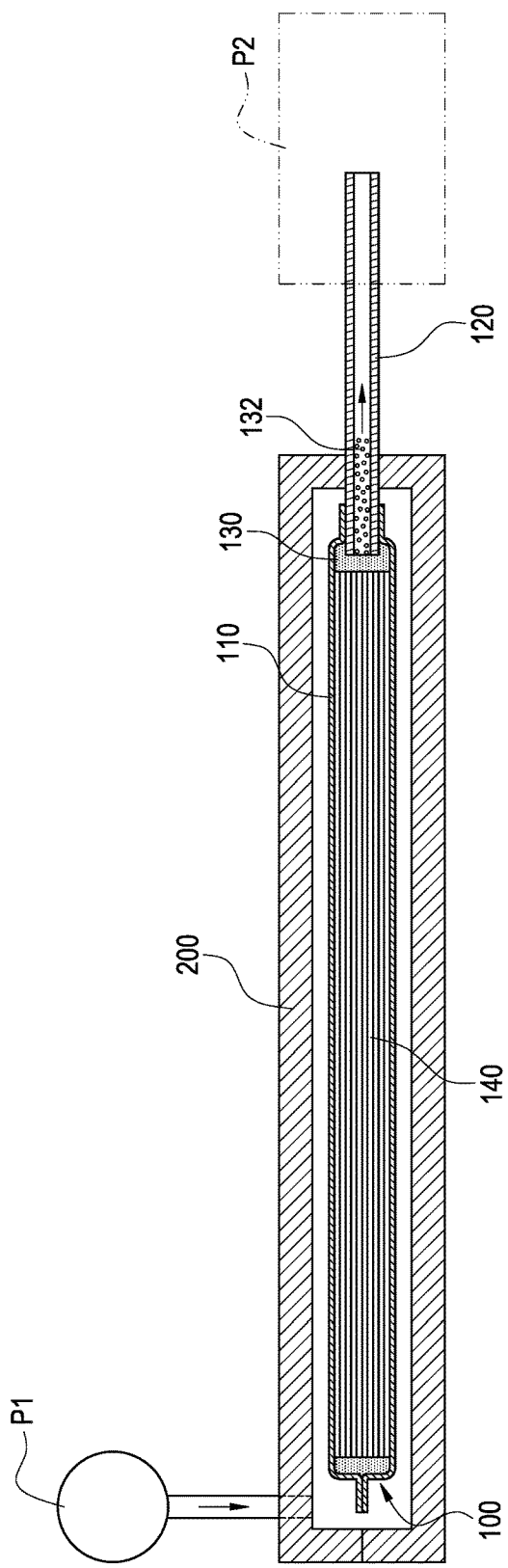
Figure 5:
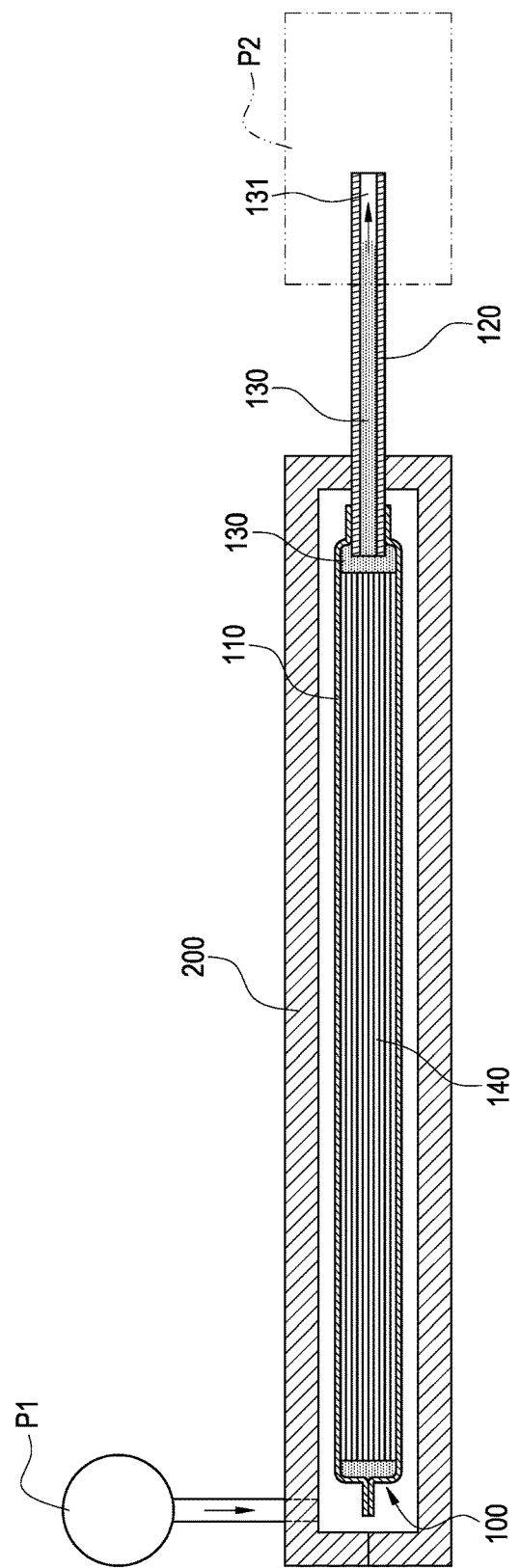

According to FIGS. 1, 4 and 5, the mixed gas 132 is extracted via the degassing tube 120 in a step c following the step b, a positive pressure is provided in the pressure chamber 200 by the pressure source P1 to provide the positive pressure on the external surface of the sealed bag 110 positive pressure and the mixed gas 132 is thereby driven to flow into the degassing tube 120. Moreover, meanwhile, a negative pressure is selectively provided on the other end of the degassing tube 120 by another pressure source P2 to accelerate the mixed gas 132 flowing into the degassing tube 120. A pressure in the degassing tube 120 is greater than another pressure in the sealed bag 110 and the vaporized electrolyte solution 130 in the degassing tube 120 is thereby pressurized to be liquefied and kept in the degassing tube 120, and the remnant gas 131 is meanwhile discharged via the degassing tube 120.

Figure 6:
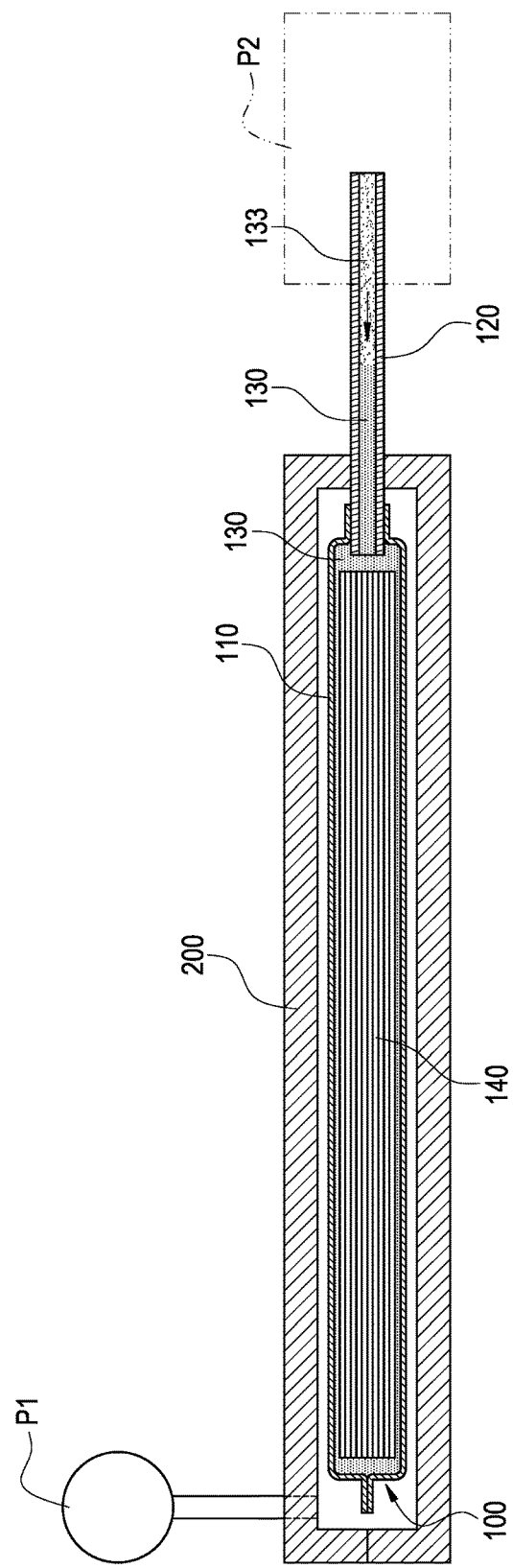

According to FIGS. 1 and 6, in a step d following the step c, the liquid electrolyte solution 130 in the degassing tube 120 is injected back into the sealed bag 110. A dry gas 133 is injected into the degassing tube 120 according to the present embodiment (preferably by the pressure source P2, but scope of the present disclosure should not be limited to the embodiment), the electrolyte solution 130 in the degassing tube 120 is pushed back into the sealed bag 110 by the dry gas 133. The dry gas 133 could be any gas excluded water, and the dry gas 133 is preferably available Nitrogen, but scope of the present disclosure should not be limited to the embodiment. A part of liquid electrolyte solution 130 could be remained in the end of the degassing tube 120 connected with the sealed bag 110, and thereby avoid gas remained in the sealed bag 110.

Figure 7:
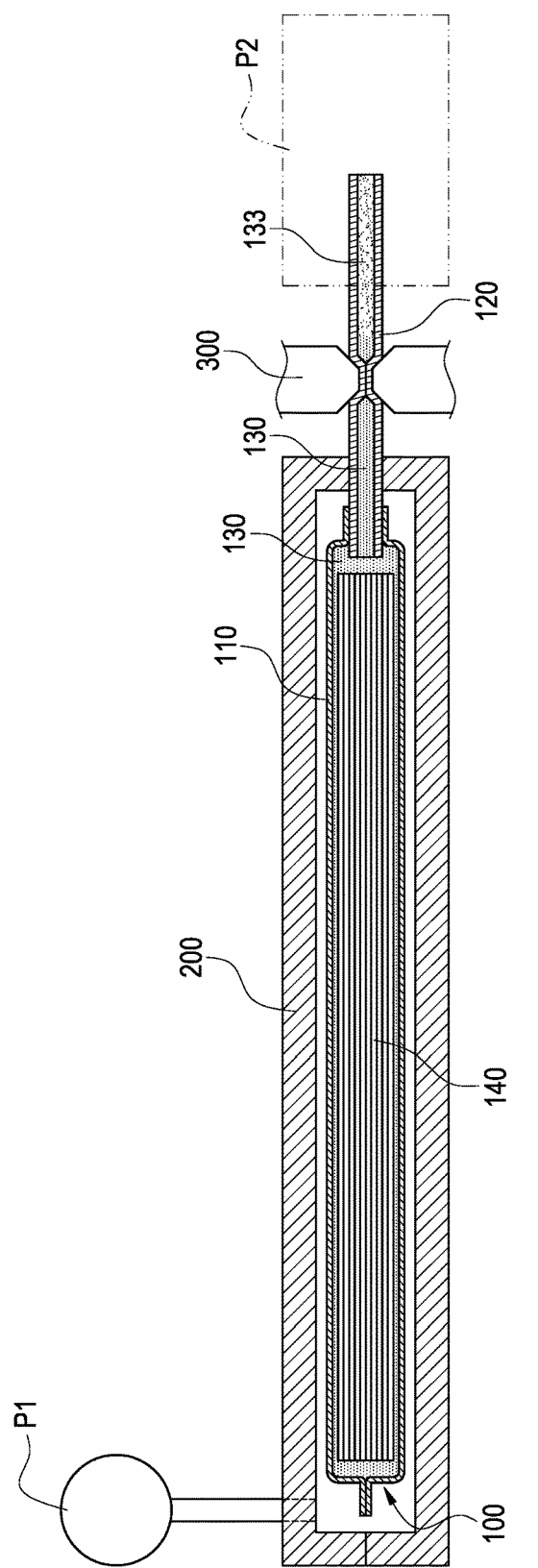
Figure 8:
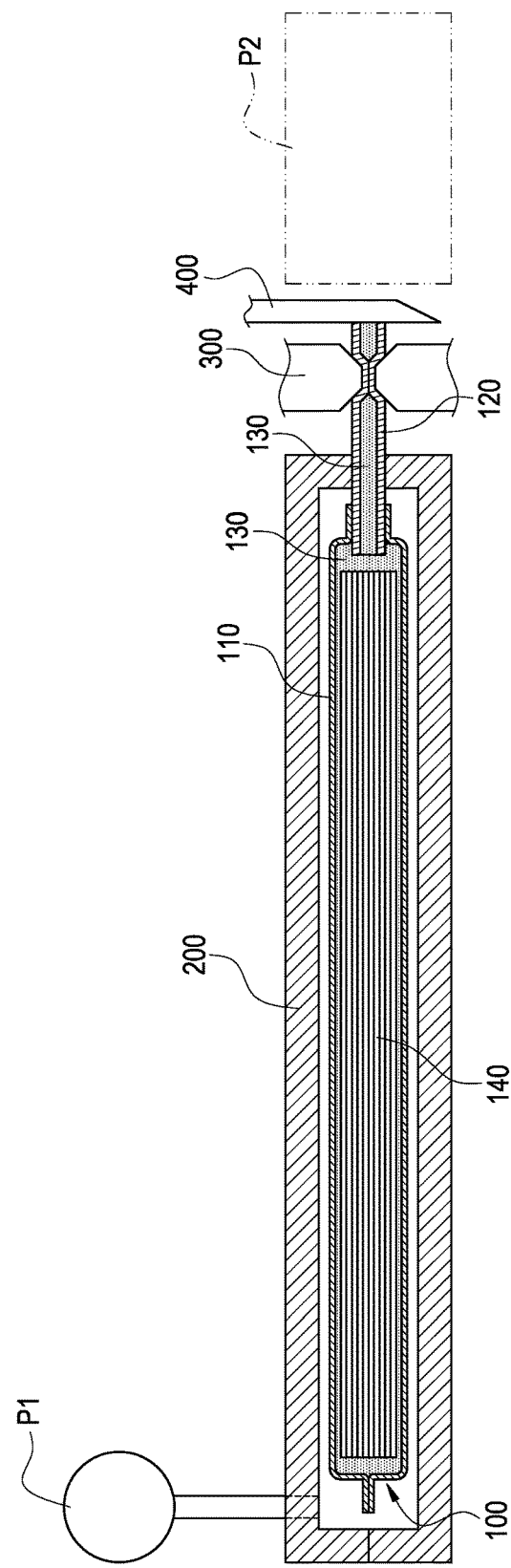

According to FIGS. 1, 7 and 8, a seal position on the degassing tube 120 is sealed in a step e following the step d and the lithium battery cell 100 is thereby sealed. According to the present embodiment, the degassing tube 120 could be melted and sealed by a sealing machine 300, and the degassing tube 120 could be meanwhile melt and cut by the sealing machine 300 or the degassing tube 120 could be cut by a knife 400. A portion of the degassing tube 120 between the seal position and the sealed bag 110 is preferably remained and the other portion of the degassing tube 120 is removed. Moreover, the seal position could be defined within the region in the degassing containing the electrolyte solution 130, and thereby avoid gas remained in the degassing tube 120.

According to the degassing method for lithium battery cell of the present disclosure, the electrolyte solution 130 is vaporized by vacuum and thereby easy to move in the electrolyte solution 130 to be separated. The present disclosure is able to completely remove bubbles from the electrolyte solution 130 and spend less time in contrast to conventional technologies, and the present disclosure further avoids loss of electrolyte solution 130 during a degassing process. Accordingly, the degassing method for lithium battery cell 100 of the present disclosure decreases costs and manufacturing time of the lithium battery cell 100, and increases performance of the lithium battery cell 100.

The electrode 140 discolors after a chemical reaction with the electrolyte solution 130, electrode 140. Therefore, the reacted electrode 140 of the lithium battery cell 100 degassed by the degassing method for lithium battery cell of the present disclosure is in a uniform color; and the remnant gas generated spots on the reacted electrode 140 of a conventional lithium battery cell electrode 140 in contrast. The lithium battery cell 100 processed by the method of the present disclosure cloud be thereby told from the conventional lithium battery cell.

Although the present disclosure has been described with reference to the foregoing preferred embodiment, it will be understood that the disclosure is not limited to the details thereof. Various equivalent variations and modifications can still occur to those skilled in this art in view of the teachings of the present disclosure. Thus, all such variations and equivalent modifications are also embraced within the scope of the present disclosure as defined in the appended claims.

What is claimed is:

1. A degassing method for lithium battery cell, comprising the following steps:
   a) providing a lithium battery cell comprising a sealed bag, a degassing tube being arranged on an external surface of the sealed bag, an end of the degassing tube communicating with a space in the sealed bag, an electrolyte solution being filled in the sealed bag and a remnant gas being contained in the sealed bag;
   b) providing a negative pressure on the external surface of the sealed bag to inflate the sealed bag and to decompress the sealed bag and a part of the electrolyte solution being thereby vaporized, the remnant gas being separated from the liquid electrolyte solution and mixed with the vaporized electrolyte solution to form a mixed gas; and
   c) extracting the mixed gas via the degassing tube, thereby the vaporized electrolyte solution being pressurized to be liquefied in the degassing tube, and the remnant gas meanwhile being discharged via the degassing tube,
   wherein the other end of the degassing tube provided in the step a is sealed, the degassing tube is cut in the step c, and the mixed gas is thereby allowed to flow into the degassing tube.

2. The degassing method for lithium battery cell according to claim 1, further comprises a step d following the step c: injecting the liquid electrolyte solution in the degassing tube back into the sealed bag.

3. The degassing method for lithium battery cell according to claim 1, wherein the lithium battery cell is arranged in a pressure chamber in the step a, and a negative pressure is provided in the pressure chamber in the step b and the negative pressure is thereby provided on the external surface of the sealed bag.

4. The degassing method for lithium battery cell according to claim 1, wherein a positive pressure is provided on the external surface of the sealed bag in the step c to drive the mixed gas to flow into the degassing tube.

5. The degassing method for lithium battery cell according to claim 4, wherein the lithium battery cell is arranged in a pressure chamber in the step a, and a positive pressure is thereby provided in the pressure chamber in the step c and the positive pressure is thereby provided on the external surface of the sealed bag.

6. The degassing method for lithium battery cell according to claim 1, wherein a negative pressure is provided on the other end of the degassing tube in the step c to drive the mixed gas to flow into the degassing tube.

7. The degassing method for lithium battery cell according to claim 2, further comprises a step e following the step d: sealing a seal position on the degassing tube.

8. A degassing method for lithium battery cell, comprising the following steps:
  a) providing a lithium battery cell comprising a sealed bag, a degassing tube being arranged on an external surface of the sealed bag, an end of the degassing tube communicating with a space in the sealed bag, an electrolyte solution being filled in the sealed bag and a remnant gas being contained in the sealed bag;
  b) providing a negative pressure on the external surface of the sealed bag to inflate the sealed bag and to decompress the sealed bag and a part of the electrolyte solution being thereby vaporized, the remnant gas being separated from the liquid electrolyte solution and mixed with the vaporized electrolyte solution to form a mixed gas;
  c) extracting the mixed gas via the degassing tube, thereby the vaporized electrolyte solution being pressurized to be liquefied in the degassing tube, and the remnant gas meanwhile being discharged via the degassing tube;
  d) injecting the liquid electrolyte solution in the degassing tube back into the sealed bag; and
  e) sealing a seal position on the degassing tube, wherein, in the step e, a portion of the degassing tube between the seal position and the sealed bag is remained and the other portion of degassing tube is removed.

9. The degassing method for lithium battery cell according to claim 1, wherein a plurality of electrodes is contained in the sealed bag and the electrodes are immersed in the electrolyte solution.

* * * * *